United States Patent
Larson et al.

(10) Patent No.: US 10,066,715 B2
(45) Date of Patent: Sep. 4, 2018

(54) FAIL-SAFE ELECTROMECHANICAL ACTUATOR

(71) Applicant: Moog Inc., East Aurora, NY (US)

(72) Inventors: Lowell Van Lund Larson, Huntington Beach, CA (US); Christopher A. Moore, Yorba Linda, CA (US)

(73) Assignee: Moog Inc., East Aurora, NY (US)

( * ) Notice: Subject to any disclaimer, the term of this patent is extended or adjusted under 35 U.S.C. 154(b) by 491 days.

(21) Appl. No.: 14/695,321

(22) Filed: Apr. 24, 2015

(65) Prior Publication Data

US 2016/0312867 A1    Oct. 27, 2016

(51) Int. Cl.
| | |
|---|---|
| F16H 25/00 | (2006.01) |
| F16H 25/20 | (2006.01) |
| B64C 13/28 | (2006.01) |
| F16H 25/22 | (2006.01) |
| F16H 25/24 | (2006.01) |

(52) U.S. Cl.
CPC .......... *F16H 25/205* (2013.01); *B64C 13/28* (2013.01); *F16H 25/2015* (2013.01); *F16H 25/2204* (2013.01); *F16H 25/2454* (2013.01)

(58) Field of Classification Search
CPC .............. F16H 25/205; F16H 25/2015; F16H 25/2018; F16H 25/2204; B64C 13/28; B64C 13/34
USPC ...... 74/10.85, 840–842, 89.3, 89.31, 424.71, 74/424.72, 424.81, 424.9, 661, 665 R, 74/724, 665 L, 665 Q, 665 P; 244/99.2–99.9
See application file for complete search history.

(56) References Cited

U.S. PATENT DOCUMENTS

| | | | | | |
|---|---|---|---|---|---|
| 2,768,539 | A | * | 10/1956 | Wollenhaupt | B23Q 5/402 173/19 |
| 3,955,629 | A | * | 5/1976 | Turner | B23Q 5/10 173/146 |
| 4,201,271 | A | * | 5/1980 | Evans | B23Q 1/70 173/146 |
| 4,494,025 | A | * | 1/1985 | Fickler | F16H 25/2018 310/112 |
| 4,557,156 | A | * | 12/1985 | Teramachi | B23Q 5/40 74/424.86 |

(Continued)

FOREIGN PATENT DOCUMENTS

| | | |
|---|---|---|
| WO | 2007024220 | 3/2007 |
| WO | 2008028184 | 3/2008 |
| WO | 2010027701 | 3/2010 |

*Primary Examiner* — Victor L MacArthur
(74) *Attorney, Agent, or Firm* — Hodgson Russ LLP

(57) ABSTRACT

An electromechanical actuator ("EMA") is provided with redundant load paths for driving the actuator stroke. The EMA includes a rotatable screw, a nut mated with the screw and having an external toothed surface, and a rotatable spline member having a splined surface engaging the external toothed surface of the nut. An actuator rod is coupled to the nut for linear movement with the nut. A first motor is operable to rotate the screw relative to the nut to cause the nut to travel linearly along the screw, and a second motor is operable to rotate the spline member and nut such that the nut travels linearly along the screw. Consequently, the actuator rod moves linearly by operation of the first motor alone, by operation of the second motor alone, and by simultaneous operation of the first and second motors. A no-back device may be incorporated into each load path.

6 Claims, 4 Drawing Sheets

(56) References Cited

U.S. PATENT DOCUMENTS

| | | | |
|---|---|---|---|
| 4,691,787 A * | 9/1987 | Akesaka | E21C 1/10 |
| | | | 173/145 |
| 4,858,491 A | 8/1989 | Shube | |
| 5,053,660 A | 10/1991 | Sneddon | |
| 5,214,972 A | 6/1993 | Larson | |
| 5,957,798 A | 9/1999 | Smith, III | |
| 6,109,415 A | 8/2000 | Morgan et al. | |
| 6,467,363 B2 | 10/2002 | Manzanares et al. | |
| 6,631,797 B2 | 10/2003 | Capewell | |
| 8,136,418 B2 * | 3/2012 | Behar | B64C 13/34 |
| | | | 244/99.2 |
| 8,266,976 B2 | 9/2012 | Waide | |
| 8,646,726 B2 | 2/2014 | Manzanares | |
| 8,794,084 B2 | 8/2014 | Nguyen et al. | |
| 8,878,466 B2 | 11/2014 | Hausberg | |
| 9,073,643 B2 * | 7/2015 | Moy | B64D 45/00 |
| 2008/0131551 A1 * | 6/2008 | Hirata | B29C 49/062 |
| | | | 425/529 |
| 2010/0059944 A1 | 3/2010 | Oteman | |
| 2013/0229074 A1 | 9/2013 | Haferman | |
| 2014/0049140 A1 * | 2/2014 | Wakita | B64C 13/28 |
| | | | 310/75 R |

\* cited by examiner

FAIL-SAFE ELECTROMECHANICAL ACTUATOR

FIELD OF THE INVENTION

The present invention relates generally to electromechanical actuators used, for example, for actuation of aircraft control surfaces.

BACKGROUND OF THE INVENTION

Aircraft control surfaces, for example flaps located on the trailing edge of a fixed wing, slats located on a leading edge of a fixed wing, spoiler panels, aileron surfaces, and the like, have traditionally been actuated by hydraulic actuation systems. More recently, electromechanical actuators ("EMAs") have gained acceptance in the aviation industry for adjusting the position of control surfaces. Known EMAs have a motor-driven ballscrew shaft mated with a ballnut. The ballnut is engaged by a surrounding spline member which prevents rotation of the ballnut while permitting axial movement of the ballnut. Thus, when the ballscrew shaft is rotated, the ballnut moves axially along the ballscrew shaft to produce linear drive. In some configurations, a brake is associated with the motor drive shaft to stop rotation and hold the ballnut at a commanded stroke position of the EMA.

The prior art has some shortcomings. For example, there is only one load path through which the actuator stroke is produced. In the event of a motor failure or mechanical jam preventing or interfering with rotation of the ballscrew shaft, there is no redundant load path through which the EMA may be operated. In configurations where a brake is used to hold the EMA at a commanded stroke position, the brake requires its own control circuitry and must be actively commanded, adding complexity to the control system architecture. In some prior art systems, motor power is maintained even when the EMA is in a braked state. In other prior art systems, a motor "power off" command is used when the EMA is in a braked state.

What is needed is an improved EMA offering redundant load paths that may be passively locked to hold the EMA at a commanded stroke position.

SUMMARY OF THE INVENTION

In accordance with the present invention, an EMA is provided with redundant load paths for driving the actuator stroke. In one embodiment, the EMA comprises a screw rotatable about a screw axis and a nut mounted on the screw in mating fashion, wherein the nut has an external toothed surface. The EMA further comprises a spline member rotatable about a spline member axis, wherein the spline member includes a splined surface engaging the external toothed surface of the nut. An actuator rod of the EMA is coupled to the nut for linear movement with the nut. A first load path of the EMA is defined by a first motor operable to rotate the screw about the screw axis relative to the nut to cause the nut to travel linearly along the screw. A second load path of the EMA is defined by a second motor operable to rotate the spline member about the spline member axis to cause the nut to rotate about the screw axis relative to the screw such that the nut travels linearly along the screw. Consequently, the actuator rod moves linearly by operation of the first motor alone, by operation of the second motor alone, and by simultaneous operation of the first motor and the second motor.

The first load path may include a no-back device between the first motor and the screw for holding the actuator rod at a commanded stroke position without the need for a powered brake mechanism. Likewise, the second load path may include a no-back device between the second motor and the spline member for the same purpose. In a space efficient configuration, the spline member may be arranged coaxially about the nut and have an internal splined surface engaging the external toothed surface of the nut.

Further embodiments of the invention provide EMAs having dual actuator rods at opposite ends of the EMA, wherein each actuator rod is individually drivable through redundant load paths. In one of these embodiments, a single screw is provided having left-handed and right-handed thread portions mated with respective nuts, wherein a first motor drives rotation of the screw, and second and third motors drive rotation of the nuts through separate spline members. In another of these embodiments, separate first and second screws and nuts are provided in mirror image relative to one another, wherein first and second motors drive rotation of the first and second screws, respectively, and wherein third and fourth motors drive rotation of spline members associated with the nuts, respectively.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
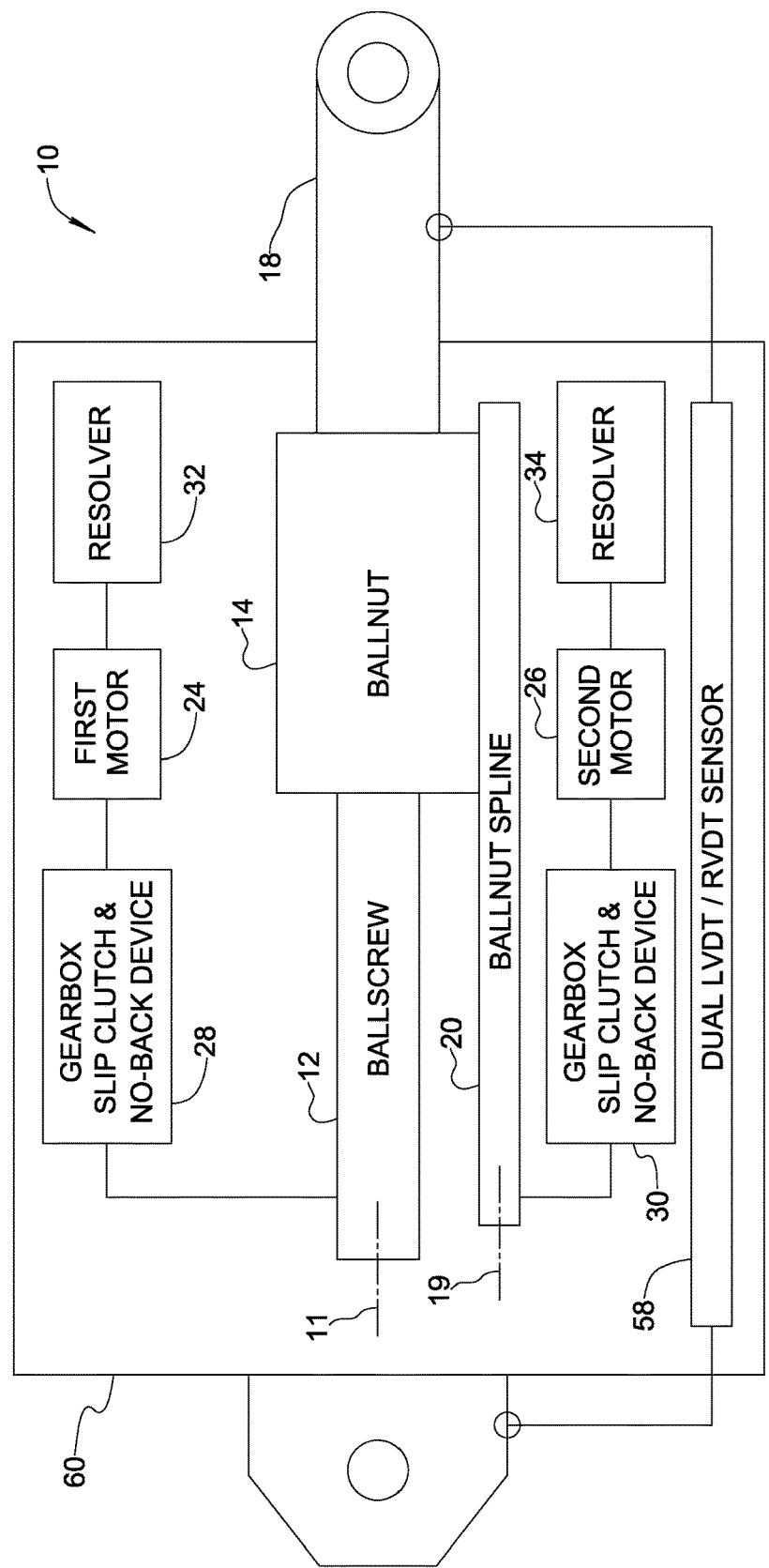
FIG. 1 is schematic block diagram of an EMA formed in accordance with an embodiment of the present invention.
Figure 2:
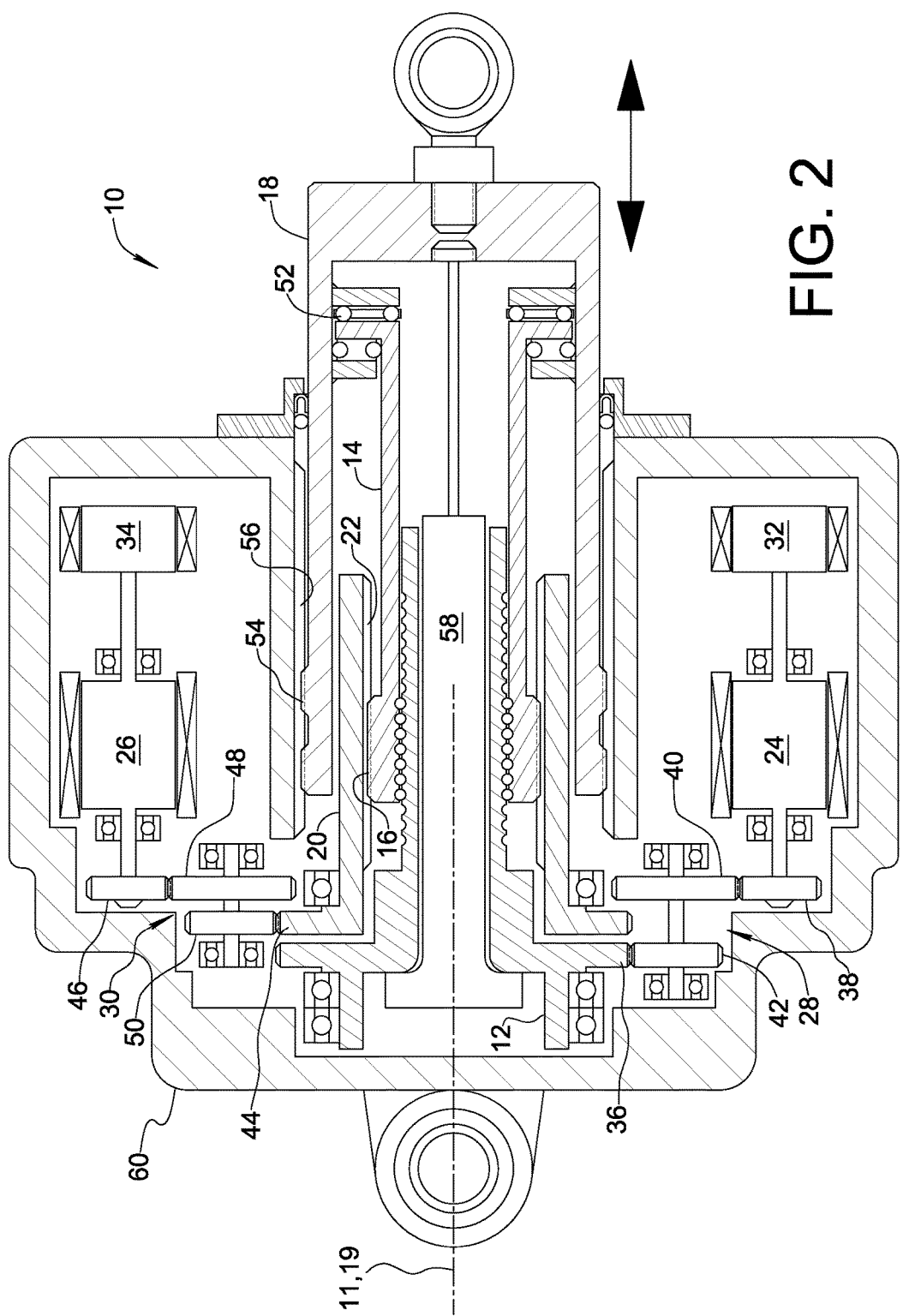
FIG. 2 is a schematic cross-sectional view of an EMA formed in accordance with an embodiment of the present invention.

FIG. 1 illustrates an EMA 10 formed in accordance with an embodiment of the present invention. EMA 10 comprises a screw 12 rotatable about a screw axis 11 of the EMA, and a mating nut 14 mounted on screw 12. As will be understood by those skilled in the EMA art, screw 12 and nut 14 may be embodied as a ballscrew and a ballnut, respectively. EMA 10 also comprises an actuator rod 18 coupled to nut 14 for linear movement with the nut along axis 11. EMA 10 further comprises a spline member 20 rotatable about a spline member axis 19 that coincides with or is parallel to axis 11. As shown in FIG. 2, spline member 20 has a splined surface 22 mated with an external toothed surface 16 of nut 14, whereby rotation of spline member 20 is accompanied by rotation of nut 14 about axis 11 without constraining travel of nut 14 along axis 11.

In accordance with the present invention, either or both of screw 12 and spline member 20 may be rotated about screw axis 11 to provide relative rotation between screw 12 and nut 14 about screw axis 11, thereby causing nut 14 to travel linearly relative to screw 12 along axis 11. In this regard, EMA 10 comprises a first motor 24 connected to screw 12 that is operable to rotate screw 12 about screw axis 11 relative to nut 14 to cause the nut to travel linearly along the screw, and a second motor 26 connected to spline member 20 that is operable to rotate the spline member about spline member axis 19. As will be understood, the rotation of spline member 20 driven by second motor 26 is accompanied by rotation of nut 14 relative to screw 12, thereby causing the nut to travel linearly along screw 12. Thus the actuator rod 18, which is arranged to extend from an end of a housing 60 of EMA 10, moves linearly relative to housing 60 by operation of first motor 24 alone, by operation of second motor 26 alone, and by simultaneous operation of first motor 24 and second motor 26.

First motor 24 may be drivably connected to screw 12 by a transmission gearbox 28 that incorporates a no-back device. Details of possible no-back devices are shown and described in U.S. Pat. Nos. 6,109,415; 6,631,797 B2; and 8,646,726 B2, the aggregate disclosures of which are incorporated herein by reference. Second motor 26 may be drivably connected to spline member 20 in similar fashion, i.e., by another transmission gearbox 30 that incorporates a no-back device. By incorporating no-back devices into the drive transmissions, EMA 10 may be passively locked to hold the EMA at a commanded stroke position without the need to command and supply power to a separate brake mechanism or the need to command power removal if power off brakes are used. Thus, where EMA 10 is used to position a flight control surface of an aircraft, the control surface can be driven to a desired position and will remain there indefinitely without motor power. Transmission gearboxes 28 and/or 30 may further incorporate a slip clutch to prevent problems arising from motor rotor inertia in the event of sudden load-induced stops.

As shown in FIG. 1, first motor 24 has a resolver 32 associated therewith for generating signal information indicative of the angular speed, direction and position of the corresponding motor shaft of first motor 24. Likewise, second motor 26 has a resolver 34 associated therewith for generating signal information indicative of the angular speed, direction and position of the corresponding motor shaft of second motor 26. While resolvers are shown in FIG. 1, encoders may be substituted to provide the signal information describing operation of motors 24, 26.

In an advantageous aspect, motors 24, 26 may be identical to one another, transmission gearboxes 28, 30 may be identical to one another, and/or resolvers 32, 34 may be identical to one another. Duplication of parts enhances bulk purchasing opportunities for more economical manufacturing of EMA 10. DC brushless motors are suitable as motors 24, 26, however other types of motors may be used.

FIG. 2 is a schematic cross-sectional view of EMA 10. Spline member 20 may be arranged coaxially about nut 14 such that screw axis 11 and spline member axis 19 coincide with one another. In this particular arrangement, the splined surface 22 of spline member 20 is an internal splined surface engaging the external toothed surface 16 of nut 14. In FIG. 2, first motor 24 is drivably connected to a toothed flange 36 of screw 12 by gears 38, 40, and 42, and second motor 26 is drivably connected to a toothed flange 44 of spline member 20 by gears 46, 48, and 50. Gears 40 and 42 may be part of transmission gearbox 28, and gears 48 and 50 may be part of transmission gearbox 30. As mentioned above, transmission gearboxes 28 and 30 may each incorporate a no-back device and/or a slip clutch mechanism.

Actuator rod 18 may be directly coupled to nut 14, or may be coupled to nut 14 through intervening structure. For example, in the illustration of FIG. 2, actuator rod 18 is coupled to an end of nut 14 by a thrust bearing 52 that allows relative rotation between nut 14 and actuator rod 18. Consequently, actuator rod 18 may be prevented from rotating with nut 14 by a splined surface 54 on the actuator rod 18 mated with a splined surface 56 on housing 60 of EMA 10. In this way, actuator rod 18 may be coupled to nut 14 for linear movement with the nut, but decoupled from the nut with respect to rotational movement.

A linear voltage differential transducer ("LVDT") 58 may be provided associated with screw 12 and actuator rod 18 to provide a signal indicative of the stroke position of actuator rod 18. Transducer 58 may be embodied as a dual LVDT and rotational voltage differential transducer ("RVDT") for generating further signal information indicating angular position of screw 12.

As will be appreciated, EMA 10 has two redundant load paths for driving the stroke of actuator rod 18. Therefore, if a mechanical jam or malfunction occurs in one of the load paths, EMA 10 may nevertheless continue to operate by switching to the other load path. The availability of a second, redundant load path improves safety. Each load path can be tested independently by locking the motor of the other load path and observing the current draw of the motor driving the tested load path.

In an aspect of the invention, first motor 24 and second motor 26 may be operated simultaneously in a speed-summing manner. First motor 24 may be operated to rotate screw 12 in a first rotational direction, and second motor 26 may be operated to rotate nut 14 in a second rotational direction opposite the first rotational direction, whereby the angular speed of screw 12 relative to nut 14 is the sum of the angular speed of the screw and the angular speed of the nut. Thus, the travel speed of nut 14 along screw 12, and the corresponding travel speed of actuator rod 18, may be increased by simultaneous speed-summing operation of first and second motors 24, 26. Speed-summing may also be used to provide a high-precision "crawl" mode for slow movements by operating first and second motors 24, 26 to rotate screw 12 and nut 14 in the same rotational direction at slightly different speeds.

Figure 3:
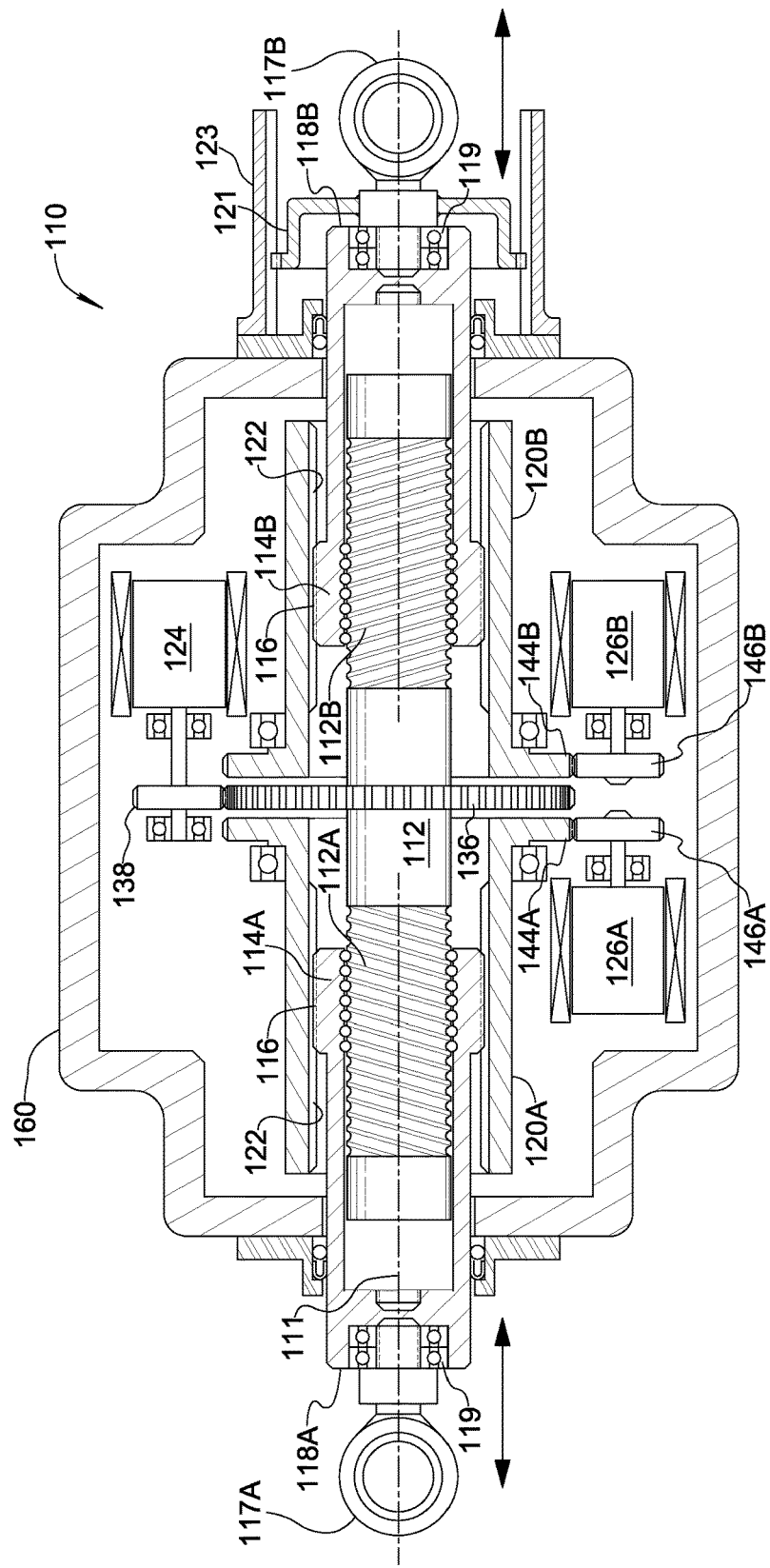
FIG. 3 is a schematic cross-sectional view of an EMA formed in accordance with another embodiment of the present invention.

FIG. 3 illustrates an EMA 110 formed in accordance with another embodiment of the present invention, wherein motor resolvers and an LVDT/RVDT sensor for feedback signaling are omitted for sake of simplicity. EMA 110 comprises a screw 112 rotatable about an axis 111. Screw 112 includes a first portion 112A having a left-handed thread and a second portion 112B having a right-handed thread. EMA 110 also comprises a first nut 114A mounted on first portion 112A of screw 112 and a second nut 114B mounted on the second portion 112B of the screw. Each of the first and second nuts 114A, 114B has a respective external toothed surface 116. EMA 110 further comprises a first rotatable spline member 120A mating with first nut 114A and a second rotatable spline member 120B mating with second nut 114B. Each spline member 120A, 120B includes a respective splined surface 122 for engaging the external toothed surface 116 of the corresponding nut 114A or 114B. As shown in FIG. 3, spline members 120A, 120B may be arranged coaxially about nuts 114A, 114B for rotation about axis 111, wherein the splined surface 122 of the spline member is an internal splined surface engaging the external toothed surface 116 of the associated nut.

EMA 110 also comprises a first actuator rod 118A coupled to first nut 114A for linear movement with the first nut, and a second actuator rod 118B coupled to second nut 114B for linear movement with the second nut. The first and second actuator rods 118A, 118B are arranged to extend from opposite ends of a housing 160 of EMA 110. In the depicted embodiment, actuator rods 118A, 118B are integrally formed with nuts 114A, 114B, respectively. Actuator rods 118A, 118B include respective end lugs 117A, 117B rotatably decoupled from the main shaft of the rod by bearings 119. A toothed collar 121 and cooperating spline tube 123 may be provided to prevent rotation of one of the end lugs, e.g. end lug 117B, relative to housing 160 while allowing axial travel of the end lug. In the depicted arrangement, toothed collar 121 is fixed to end lug 117B and spline tube 123 is fixed to housing 160.

In the embodiment of FIG. 3, EMA 110 includes three motors for driving rotation of screw 112, first nut 114A, and second nut 114B, respectively. A first motor 124 is connected to screw 112 and is operable to rotate screw 112 about axis 111 relative to first nut 114A and second nut 114B to cause the first and second nuts to travel linearly along the first and second portions 112A, 112B of the screw, respectively. A second motor 126A is connected to first spline member 120A and is operable to rotate the first spline member 120A to thereby rotate first nut 114A about axis 111 relative to screw 112 to cause first nut 114A to travel linearly along first portion 112A of the screw. Likewise, a third motor 126B is connected to the second spline member 120B and is operable to rotate the second spline member 120B to thereby rotate second nut 114B about axis 111 relative to screw 112 to cause second nut 114B to travel linearly along second portion 112B of the screw. In FIG. 3, first motor 124 is drivably connected to a toothed flange 136 at an intermediate location along screw 112 by gear 138, second motor 126A is drivably connected to a toothed flange 144A of first spline member 120A by gear 146A, and third motor 126B is drivably connected to a toothed flange 144B of second spline member 120B by gear 146B.

As can be understood, first actuator rod 118A moves linearly by operation of first motor 124 alone, by operation of second motor 126A alone, and by simultaneous operation of first motor 124 and second motor 126A. As can also be understood, second actuator rod 118B moves linearly by operation of the first motor alone, by operation of third motor 126B alone, and by simultaneous operation of first motor 124 and third motor 126B.

The embodiment of FIG. 3 offers various options for controlling the actuator stroke of EMA 110. When first motor 124 is operated alone, actuator rods 118A, 118B will either extend or retract simultaneously depending upon the direction of rotation of screw 112. Speed summing is available with respect to either or both actuator rods by driving the respective spline member motor 126A, 126B in coordination with first motor 124. When second motor 126A is operated alone, first actuator rod 118A will extend or retract depending upon the direction of rotation of first nut 114A, while second actuator rod 118B remains stationary. Similarly, when third motor 126B is operated alone, second actuator rod 118B will extend or retract depending upon the direction of rotation of second nut 114B, while first actuator rod 118A remains stationary. Actuator rods 118A, 118B may be provided with different linear stroke speeds and directions (i.e. one may extend while the other retracts, and vice versa) by controlling the operation of motors 126A, 126B, with or without simultaneous operation of first motor 124.

First actuator rod 118A and its respective drive components (e.g. first threaded portion 112A, first nut 114A, first spline member 120A, toothed flange 144A, gear 146A, and second motor 126A) may be sized differently from their "B" counterparts on the opposite side of toothed flange 136 to better configure the EMA 110 for driving different loads and/or different stroke lengths. For example, the actuator rods 118A, 118B may be connected to two different adjacent slats or adjacent flaps along the inner and outer portions of a wing, respectively, for simultaneous and/or independent control of the two slats or the two flaps. As another example, actuator rods 118A, 118B may be connected to a slat on the leading edge of the wing and a flap on the trailing edge of the wing, respectively, for simultaneous and/or independent control of the slat and the flap.

Figure 4:
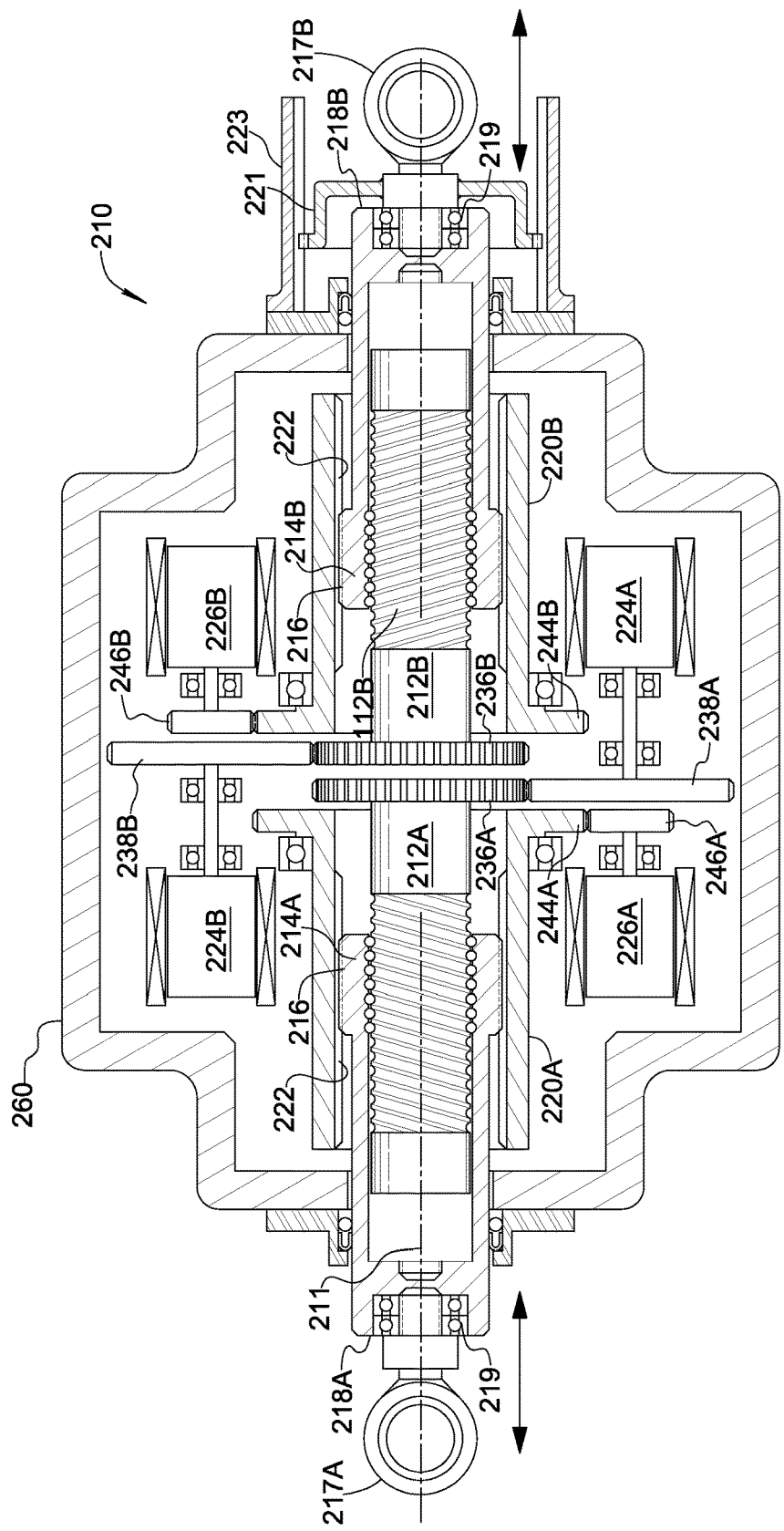
FIG. 4 is a schematic cross-sectional view of an EMA formed in accordance with a further embodiment of the present invention.

FIG. 4 shows an EMA 210 formed in accordance with a further embodiment of the present invention. Here again, motor resolvers and an LVDT/RVDT sensor for feedback signaling are omitted for sake of simplicity. EMA 210 basically comprises "mirror image" actuator portions allowing further operational control of the EMA.

EMA 210 comprises a first screw 212A and a second screw 212B each rotatable about a screw axis 211, wherein the first screw 212A has a left-handed thread and the second screw 212B has a right-handed thread. EMA 210 also comprises a first nut 214A mounted on first screw 212A and a second nut 214B mounted on second screw 212B, wherein each of the nuts 214A, 214B has a respective external toothed surface 216. EMA 210 further comprises a first rotatable spline member 220A mating with first nut 214A and a second rotatable spline member 220B mating with second nut 214B. Each spline member 220A, 220B includes a respective splined surface 222 for engaging the external toothed surface 216 of the corresponding nut 214A or 214B. As shown in FIG. 4, spline members 220A, 220B may be arranged coaxially about nuts 214A, 214B for rotation about axis 211, wherein the splined surface 222 of the spline member is an internal splined surface engaging the external toothed surface 216 of the associated nut.

EMA 210 also comprises a first actuator rod 218A coupled to first nut 214A for linear movement with the first nut, and a second actuator rod 218B coupled to second nut 214B for linear movement with the second nut. The first and second actuator rods 218A, 218B are arranged to extend from opposite ends of a housing 260 of EMA 210. Actuator rods 218A, 218B include respective end lugs 217A, 217B rotatably decoupled from the main shaft of the rod by bearings 219. A toothed collar 221 and cooperating spline tube 223 may be provided to prevent rotation of one of the end lugs, e.g. end lug 217B, relative to housing 260 while allowing axial travel of the end lug. In the depicted arrangement, toothed collar 221 is fixed to end lug 217B and spline tube 223 is fixed to housing 160.

As may be seen, EMA 210 has four motors for driving rotation of first screw 212A, second screw 212B, first nut 214A, and second nut 214B, respectively. A first motor 224A is connected to first screw 212A and is operable to rotate first screw 212A about axis 211 relative to first nut 214A to cause first nut 214A to travel linearly along first screw 212A. Similarly, a second motor 224B is connected to second screw 212B and is operable to rotate second screw 212B about axis 211 relative to second nut 214B to cause second nut 214B to travel linearly along second screw 212B.

A third motor 226A is connected to first spline member 220A and is operable to rotate first spline member 220A to thereby rotate first nut 214A about axis 211 relative to first screw 212A to cause first nut 214A to travel linearly along first screw 212A. Likewise, a fourth motor 226B is connected to second spline member 220B and is operable to rotate second spline member 220B to thereby rotate second nut 214B about axis 211 relative to second screw 212B to cause second nut 214B to travel linearly along second screw 212B.

In the embodiment of FIG. 4, first motor 224A is drivably connected to a toothed flange 236A of first screw 212A by gear 238A, second motor 224B is drivably connected to a toothed flange 236B of second screw 212B by gear 238B, third motor 226A is drivably connected to a toothed flange 244A of first spline member 220A by gear 246A, and fourth motor 226B is drivably connected to a toothed flange 244B of second spline member 220B by gear 246B.

Thus, first actuator rod 218A moves linearly relative to housing 260 by operation of first motor 224A alone, by operation of third motor 226A alone, and by simultaneous operation of first motor 224A and third motor 226A. Similarly, second actuator rod 218B moves linearly relative to housing 260 by operation of second motor 224B alone, by operation of fourth motor 226B alone, and by simultaneous operation of second motor 224B and fourth motor 226B.

The embodiment of FIG. 4 provides flexibility for controlling the actuator stroke of EMA 210. Unlike the embodiment shown in FIG. 3 that has a single screw 112 having different portions 112A, 112B, the rotational speed and rotational direction of screws 212A and 212B may be controlled independently in EMA 210. Because screws 212A and 212B can be rotated independently in different directions, they may both have the same type of threads, e.g. right-handed threads, although left-handed and right-handed threads are depicted in FIG. 4. Speed summing is available with respect to either or both actuator rods 218A, 218B by driving the respective spline member motor 226A or 226B in coordination with the respective screw motor 224A or 224B. As will be understood, the stroke of first actuator rod 218A may be controlled completely independently of the stroke of second actuator rod 218B. First motor 224A and/or third motor 226A may be operated to drive the stroke of first actuator rod 218A, while second motor 224B and fourth motor 226B are not energized such that second actuator rod 218B remains stationary. Conversely, second motor 224B and/or fourth motor 226B may be operated to drive the stroke of second actuator rod 218B, while first motor 224A and third motor 226A are not energized such that first actuator rod 218A remains stationary. Actuator rods 218A, 218B may be provided with different linear stroke speeds and directions (i.e. one may extend while the other retracts, and vice versa) by controlling the operation of motors 224A, 226A on the one hand, and the operation of motors 224B, 226B on the other. The opposite "A" and "B" mechanisms of EMA 210 may be sized and configured differently to better handle different loading conditions and different stroke length requirements.

While not shown in FIGS. 3 and 4, one skilled in the art will understand that no-back devices may be incorporated in the drive transmissions associated with the screw(s) and/or the spline members of EMAs 110 and 210 in a manner taught above for EMA 10.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:

1. An electromechanical actuator comprising:
    a screw rotatable about a screw axis;
    a nut mounted on the screw, the nut having an external toothed surface;
    a spline member rotatable about a spline member axis, the spline member including a splined surface engaging the external toothed surface of the nut;
    an actuator rod coupled to the nut for linear movement with the nut;
    a first motor connected to the screw, the first motor being operable to rotate the screw about the screw axis relative to the nut to cause the nut to travel linearly along the screw relative to the spline member;
    a second motor connected to the spline member, the second motor being operable to rotate the spline member about the spline member axis to cause the nut to rotate about the screw axis relative to the screw such that the nut travels linearly along the screw relative to the spline member; and
    a first no-back mechanism, wherein the first motor is connected to the screw by way of the first no-back mechanism;
    wherein the actuator rod moves linearly by operation of the first motor alone, by operation of the second motor alone, and by simultaneous operation of the first motor and the second motor.

2. The electromechanical actuator according to claim 1, wherein the first motor is operable to rotate the screw in a first rotational direction and the second motor is operable to rotate the nut in a second rotational direction opposite the first rotational direction, whereby the angular speed of the screw relative to the nut is the sum of the angular speed of the screw and the angular speed of the nut.

3. The electromechanical actuator according to claim 1, further comprising a second no-back mechanism, wherein the second motor is connected to the spline member by way of the second no-back mechanism.

4. The electromechanical actuator according to claim 1, wherein the spline member is arranged coaxially about the nut and the splined surface is an internal splined surface.

5. An electromechanical actuator comprising:
    a screw rotatable about an axis, the screw including a first portion having a left-handed thread and a second portion having a right-handed thread;
    a first nut mounted on the first portion of the screw and a second nut mounted on the second portion of the screw, each of the first and second nuts having an external toothed surface;
    a first spline member rotatable about the axis, the first spline member being arranged about the first nut and including an internal splined surface engaging the external toothed surface of the first nut;
    a second spline member rotatable about the axis, the second spline member being arranged about the second nut and including an internal splined surface engaging the external toothed surface of the second nut;
    a first actuator rod coupled to the first nut for linear movement with the first nut, and a second actuator rod coupled to the second nut for linear movement with the second nut;
    a first motor connected to the screw, the first motor being operable to rotate the screw about the axis relative to the first nut and the second nut to cause the first and second nuts to travel linearly along the first and second portions of the screw, respectively;
    a second motor connected to the first spline member, the second motor being operable to rotate the first spline member and the first nut about the axis relative to the screw to cause the first nut to travel linearly along the first portion of the screw; and a third motor connected to the second spline member, the third motor being operable to rotate the second spline member and the second nut about the axis relative to the screw to cause the second nut to travel linearly along the second portion of the screw;

wherein the first actuator rod moves linearly by operation of the first motor alone, by operation of the second motor alone, and by simultaneous operation of the first motor and the second motor; and wherein the second actuator rod moves linearly by operation of the first motor alone, by operation of the third motor alone, and by simultaneous operation of the first motor and the third motor.

6. The electromechanical actuator according to claim 5, wherein
- the first motor is operable to rotate the screw in a first rotational direction;
- the second motor is operable to rotate the first spline member and the first nut in a second rotational direction opposite the first rotational direction, whereby the angular speed of the screw relative to the first nut is the sum of the angular speed of the screw and the angular speed of the first nut; and
- the third motor is operable to rotate the second spline member and the second nut in the second rotational direction, whereby the angular speed of the screw relative to the second nut is the sum of the angular speed of the screw and the angular speed of the second nut.

* * * * *